Patented Nov. 25, 1941

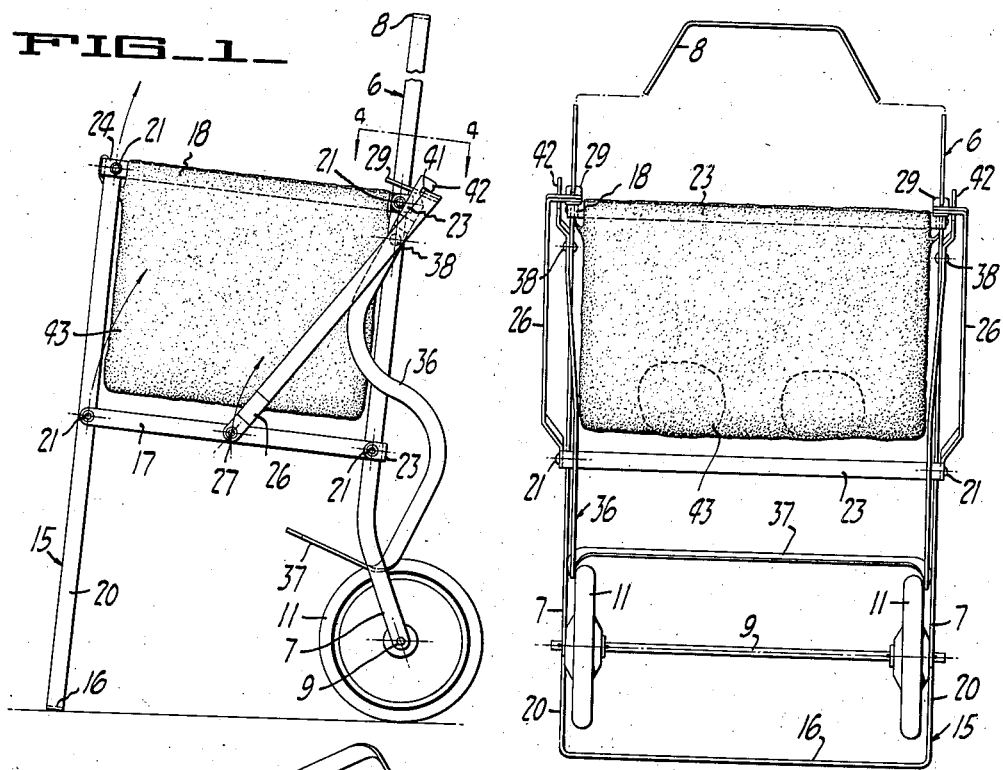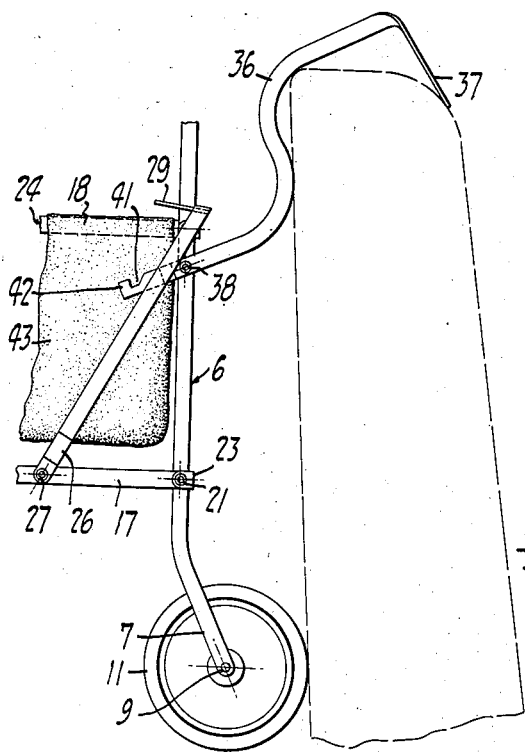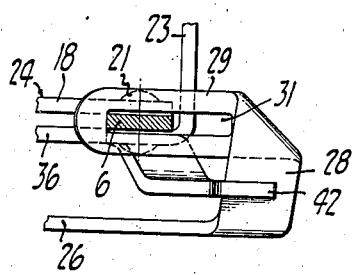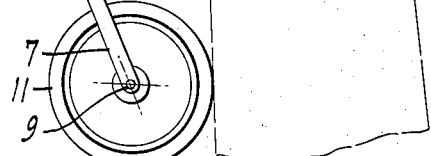

2,264,121

UNITED STATES PATENT OFFICE 2,264,121

BABY CARRIAGE

William C. Pattiani, Oakland, Calif.

Application November 25, 1940, Serial No. 366,939

4 Claims. (Cl. 280—41)

This invention relates to a baby carriage structure, particularly one designed for multiple use as a vehicle structure and as a seat for an infant in an automobile.

The automobile has become such a part of modern life that parents have become accustomed to driving about, taking infants with them. It is difficult to carry the usual baby carriage or perambulator about in an automobile and, at the same time, there is a definite need for a suitable auxiliary seat for an infant in an automobile. A small child cannot be left alone in a parked car nor can one be safely permitted to roam about the car while it is in motion because of the danger of sudden brake application or sudden movement of the car may throw the child about dangerously.

In general, the broad object of the present invention is to provide a simple infant's carrier structure which can be employed as a seat in an automobile or, easily removed therefrom and employed as a perambulator.

Another object of the present invention is to provide a simple, strong and rugged infant's perambulator.

The invention includes other objects and features of advantage some of which, together with the foregoing, will appear in the following description of the present preferred embodiment of the structure of my invention. In the drawing accompanying and forming a part hereof I have shown one form of device which is illustrative of the present invention.

In the drawing,

Figure 1 is a side elevation of a device embodying the structure of the present invention.

Figure 2 is a rear view of the device shown in Figure 1.

Figure 3 is a fragmentary view illustrating how the device is employed in an automobile while Figure 4 is a section taken along the line 4—4 in Figure 1.

Referring to the drawing I have illustrated the construction embodying the present invention as including a main frame member 6 made up of a relatively long strap iron member bent about its central portion into a suitable shape to provide wheel supporting legs 7 projecting generally rearwardly to provide stability. The frame member extends upwardly and is bent upon itself as at 8 to provide a suitable handle portion. An axle 9 is positioned between the opposite legs 7, wheels 11 being positioned on the axle, preferably on the inside of and adjacent to legs 7.

The device includes a forward leg surface indicated generally at 15 likewise formed of a suitable strap iron portion bent upon itself into a U shape with the base 16 horizontal and legs 20 extending upwardly. The forward legs structure 15 is secured by parallel links 17 and 18 to each side of the main frame member 6. The parallel links 17 and 18 are hinged as by rivets 21 so that the frame members are movable relative to each other as from the extended infant carriage position in Figure 1 into a collapsed position into which links 17 and 18 move along the direction lines and wherein the lines 17 and 18 extend along frame 6 with the leg structure closely adjacent to the frame 6. The rivets 21 also secure transverse braces 23 to frame 6. Links 17 are simple members merely extending between structure 15 and frame 6. Links 18 are conveniently the legs on a U member 24 the base of which extends across the front of the carriage between legs 20.

In accordance with this invention a brace member 26 is movably supported as by a rivet 27 on each link 17 in an upwardly extending position. Adjacent its upper end the brace member 26 is bent transversely as at 28 to include a forwardly extending ear 29 apertured as at 31 to pass slidably the frame member 6 above the upper link 18.

An automobile seat engaging member 36 likewise formed of strap iron is bent to provide a suitable seat engaging hook portion 37. The member 36 is rotatably secured as by rivets at 38 to each side of the frame 6 and projects therefrom as in Figure 3 to engage an auto seat or other support. The hook 37 is made deep enough to ensure retention on a support and yet facilitate removal, the frame 6 lying along the auto seat and being cushioned by the seat. The seat engaging member is also movable about rivets 38 into a collapsed position as in Figures 1 and 2. In this position, notch 41 on extending end 42 on each side of the members engages each flat portion 28 on the brace member 26 to lock the brace member and the entire seat against collapsing. When the structure is positioned upon an automobile seat, there is, of course, no necessity to guard against collapsing. Consequently release of the brace members is permissible.

A suitable infant seat as at 43 is provided by a canvas cloth structure suitably fastened removably or permanently on links 18, transverse braces 23 and the base of U member 24 at the top of the perambulator.

From the foregoing I believe it will be apparent that I have provided a simple, rugged and yet safe infant carriage useful as such or as an automobile seat, for example. As appears in Figure 3, the device is readily positioned in an automobile with hook 37 engaged over the back of a seat and retained thereon. The wheels 11 rest against the seat due to the rearward sweep of the frame member 6. When it is desired to remove the device, even with an infant in it, the device can be readily removed, it merely being necessary to lift the hook off the seat. In this case, wheels 11 assist removal, rotating against the seat and rendering it easily movable.

I claim:

1. In a device of the character described, a frame structure including a first inverted U strap iron member having each end thereof extending forwardly to support a pair of wheels adjacent the ends of the U and in advance of said member, a second U strap iron member, links pivotally joining said members to provide a frame structure in which said second U member provides a ground engaging support spaced from said wheels to provide a stable support with said wheels; and a hook member pivotally supported on said first U member and selectively engageable with a support such as an automobile seat in one position and with said frame structure in another position to lock said frame structure in open position.

2. In a device of the character described, a frame structure including a first inverted U strap iron member having wheels adjacent the ends of the U and in advance of said member, a second U strap iron member, and links pivotally joining said members to provide a frame structure in which said second U member provides a ground engaging support, a seat member carried by said structure; and a hook member pivotally supported on said first U member and selectively engageable with a support such as an automobile seat in one position and with said frame structure in another position to lock said frame structure in open position.

3. In a device of the character described, a first inverted U strap iron member having wheels adjacent the ends of the U, a second U strap iron member, parallel links pivotally joining said members to provide a frame structure, a seat member carried by said structure, a brace member extending to engage slidably said first U member, and a hook member movably supported on said first U member and engageable with a support such as an automobile seat in one position and engageable with said brace member in a second position to lock said members relative to each other.

4. In a device of the character described, a frame structure including a front and a back joined together by several links pivotally securing the front and back together and supporting them for movement between an open and a collapsed position, and a hook member pivoted on said back and movable to support said frame in open position and movable to engage the frame structure and lock said frame against collapsing.

WILLIAM C. PATTIANI.